Sept. 14, 1965   E. W. MURR   3,205,716

TENSION RELEASE MECHANISM

Filed March 24, 1964

INVENTOR.
EUGENE W. MURR
BY
Kimmel & Crowell
ATTORNEYS.

United States Patent Office 3,205,716
Patented Sept. 14, 1965

3,205,716
TENSION RELEASE MECHANISM
Eugene W. Murr, 574 N. 32nd, Springfield, Oreg.
Filed Mar. 24, 1964, Ser. No. 354,414
1 Claim. (Cl. 74—2)

This invention relates to improvements in a tension release device for cables, lines, chains, draft connections and the like, and more particularly to a quick release coupling device for use in log handling, ploughing in rough terrain or other similar uses where a quick release coupling is necessary when the drawn object contacts an immovable object or where the tension on the coupling exceeds the safe tension pull of the equipment and the like. This invention is an improvement to applicant's U.S. Patent No. 3,077,114, issued Feb. 12, 1963.

The device of the instant invention provides a simple, compact, economical and efficient release mechanism which can be adjusted to various degrees of tension pull so that it will quickly release if the cable or its load become snagged, or otherwise fouled, thereby preventing the cable from breaking causing damage to the pulling equipment or other property, or injury to workmen.

As conducive to a clearer understanding of this invention, it may be pointed out that in the field of logging, for example, this device is invaluable in the yarding operation, where logs are prone to becoming hung-up on stumps, boulders or other immovable objects which would ordinarily break the main line cables of the yarder causing injury and damage to equipment and personnel.

It is to be uederstood that the mechanism of this invention is not limited to any one field of usage, but is designed for universal use wherever cables, lines, chains, or the like are used.

A primary object of this invention is to provide a simple, stable, compact, efficient and economical release mechanism which can be adjusted to different values of tension pull so that it will substantially instantaneously release a cable if the cable or its load becomes snagged, or otherwise fouled.

Still other objects of the invention reside in the combination of elements, arrangement of parts, features of construction, all as will be more fully pointed out hereinafter and disclosed in the accompanying drawing, wherein there is shown a preferred embodiment of this inventive concept.

In the drawing.

Like reference numerals represent like parts in the several different views of the drawing.

Figure 1:
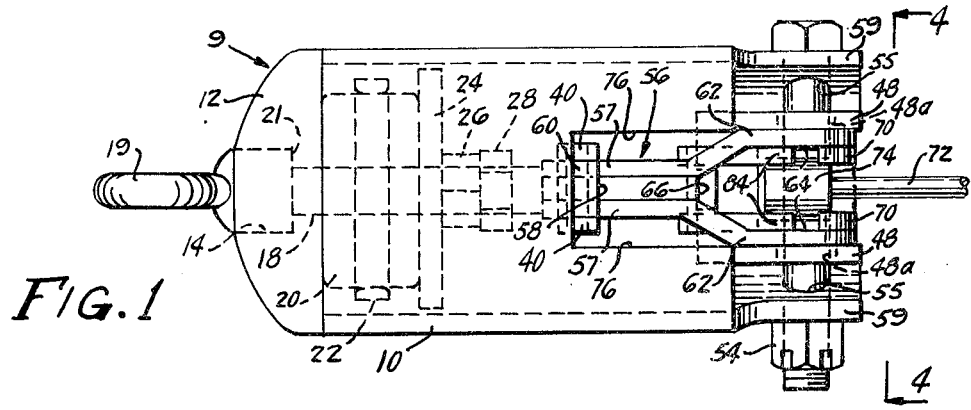
FIGURE 1 is a longitudinal plan view along the pulling axis of this inventive mechanism.
Figure 2:
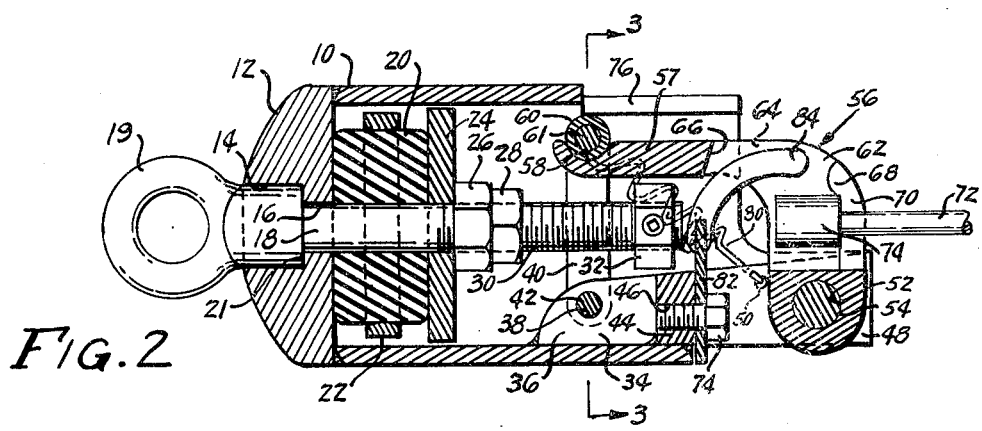
FIGURE 2 is a longitudinal sectional view taken through the longitudinal axis of this new mechanism.
Figures 3, 4:
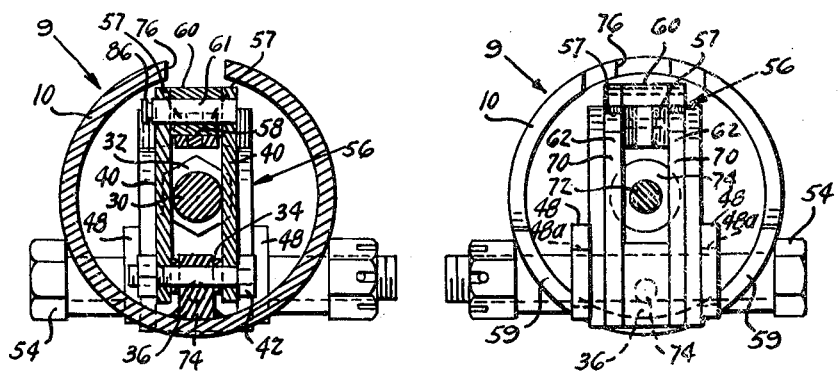
FIGURE 3 is a transverse sectional view of FIGURE 2 taken substantially on lines 3—3 in the direction of the arrows.
FIGURE 4 is a right view of FIGURE 1, taken substantially on lines 4—4, in the direction of the arrows.

Referring to the drawing, the inventive release coupling means 9, in general, comprises an intermediate tubular body means 10, which is integral or connected by welding or other conventional means to an end cap 12 having a shouldered bore 14 therein connected to a central bore 16 to receive swivel draw rod means 18 which terminates at one end in an eye loop means 19 containing a shoulder means 21 thereon adapted to be received in aperture 14. Rod means 18 is further adapted to intermediately carry a resilient deformable member 20, retaining wall means 22 and plate bearing means 24 abutting nut means 26 secured by lock nut means 28 and thread means 30 in spaced relationship to an actuating nut means 32 at the distal end of shaft means 18. The right end of member 10 of FIGURE 1, is integral or secured by welding or other conventional means to anchor means 34 having a longitudinal extending boss 36 containing therein aperture means 38 adapted to carry latching means 40 pivotally secured thereto by pin means 42. Anchor means 34 further comprises an intermediate arcuate transverse shoulder means 44 having threaded aperture means 46 therein and terminates in a further extending end means 48 having a spring anchoring aperture means 50 and an enlarged bolt aperture means 52 therein to receive bolt means 54 which pivotally carries pivoted release arm means 56, which comprises a horizontally disposed section 57 having a recess means 58 adapted to operatively comate with roller means 60 carried by pin means 61 of latching means 40, and a vertically disposed section 62 having a slot 64 therein which terminates at one end in a sloping portion 66 and at the other end in an arcuate shaped web portion 68 having a recess or slot means 70 therein adapted to receive cable means 72 connected to a conventional anchor or cable nubbin end securing means 74.

Body member 10 contains therein a longitudinal slot means 70 at one end thereof adapted to freely and pivotally receive the horizontally disposed section 57 when latching means 40 and roller means 60 biased by spring means 80 are released from latching means 40 during an unsafe tensional pull on cable means 72.

Arcuate shoulder means 44 threadably receives screw bolt means 74 which fixedly carries plate means 82 conventionally connected to a mud guard and arcuate tongue like means 84 which is novel in that means 84 holds nubbin means 74 in recess means 70 preventing nubbin means 74 from falling therefrom when cable line 72 is slack.

Eye means 19 is adapted to be secured to another conventional cable or draft means, as desired.

Spring bias means 80 is secured at one end by conventional hook like means in aperture 50 in longitudinally extending connecting support means 48 and secured at the other end by like arcuate hook means to external arcuate recess means 86 of pin means 61.

The release arm means 56 is also pivotally secured at its outer end by bolt means 54 secured in aperture means 55 of the oppositely disposed ear means 59 of body member 10, as best shown in FIGURE 1. Therefore, bolt means 54 rigidly interconnects ear means 59 with bifurcated end means 48 by aperture means 55 and aperture means 48a in end means 48.

Thus, instant inventive release draft coupling device is unique in that it requires a minimum of parts, is compact, light in handling, and reliable in operation thereof.

The instant inventive release draft coupling mechanism, in summary, comprises a composite tubular body means 9, a resiliently mounted draft rod means in the bore of said body means having spaced abutments thereon to comate with like abutments in said bore, a biased release latching means adapted to releasably secure the end of a draft cable means within the distal end of said body means, said composite body means being adapted to releasably connect a prime mover draft means to a draft cable, chain or the like connected to a load means for transport thereof.

In operation, during a normal tensional pull on eye means 19 and cable means 72 of release coupling 9, nubbin means 74 is secured in slot means 70 and the release arm 57 is fixedly secured by roller means 60 of latching means 40 which is seated in the recess 58 in the horizontally disposed section of the release arm 56, and draw rod means 18 connected to eye means 19 is secured by nut means 26 and compression plate means 24 against resilient deformable member 20 (rubber or other desired material) against cap 12. Mud guard means 84 prevents cable nubbin means 74 from falling out of slot means 64 of release arm 56 when cable means 72 is slack in pull.

Should the object drawn by cable means 72 become snagged placing a breaking tensional pull on cable means 72 then resilient deformable member 20 will compress allowing actuating nut means 32 to strike pivoted latching means 40 disengaging roller means 60 from recess means 58 allowing release arm 56 to rotate clockwise about bolt means 54 allowing cable nubbin means 74 to slide over contact surface means 68 and out from the slot 64 releasing cable means 72 from the release arm 56 of the present invention.

The allowable or preset tensional pull on the instant inventive mechanism may be adjusted by nut means 26, 28 and 32 on draw rod 18. The resilient deformable member 20 of the instant invention may be of a spring material, rubber material or other suitable means, as desired, for the purpose intended.

The improvement of this invention over applicant's earlier patent resides in the specific construction of the release arm 56 and the latching means 40, and the cooperative arrangement and operation thereof thereby constituting a different mode of operation than that inherent in the above patent contributing to a lighter weight release coupling device accompanied by a more positive release means therefor.

A still further improvement of the instant invention resides in the use of a rubber cylinder means 20 (or other deformable material) retained in ring or wall means 22 which reduces substantially the size and weight of the instant release coupling device contributing in great measure to the above aforementioned advantages.

From the foregoing, it will now be seen that there is herein provided an improved line tension release device which accomplishes all the objects of this invention, and others, including many advantages of great practical utility and commercial importance.

As many embodiments may be made of this inventive concept as desired by those skilled in the art without departing therefrom, and therefore, it is to be understood, that all matter herein is to be interpreted merely as illustrative, and not in a limiting sense.

I claim:

A tension release mechanism of the character described comprising an elongated tubular body, a closure cap permanently secured to one end thereof, an axial bore which extends through said cap, a pair of annularly spaced opposed ears which are integral with said body and extend forwardly from the open end thereof, transversely aligned apertures in said ears, a shaft secured in and between said apertures, an elongated draw rod slidably mounted in said bore, the outer end of said rod being provided with a cable receiving eye and a shoulder which is adapted to engage the outer side of said cap to limit the inward movement of said rod, the inner end of said rod being provided with threads, a disk slidably mounted on said rod within said housing, a resilient deformable member disposed about said rod between said disk and the inner side of said cap, a retaining nut by which said disk is maintained in contact with said deformable member threaded onto said rod, an actuating nut adjustably threaded onto the inner end of said rod in spaced relation to said retaining nut; an L-shaped release arm comprising a vertically disposed section the lower end of which is pivotally mounted upon said shaft between said ears, and a horizontally disposed section which extends rearwardly from the upper end of said vertical section into said housing above said rod, a transversely extending arcuate recess formed in the upper surface of said horizontally disposed section adjacent the free end thereof; a longitudinally extending slot formed in said tubular body which extends rearwardly from the open end of said body over said horizontally disposed section; latching means by which said release arm is normally constrained against rotation out of said body through said slot, said latching means comprising; a boss secured to the inner wall of said body below said rod, a pair of similar links which are pivotally secured to said boss and extend upwardly therefrom one on each side of said rod and said horizontally disposed section, a cylindrical member which is connected to and between the upper ends of said lings above said horizontally disposed arm and is adapted to seat in said arcuate recess; spring means by which said latching means is yieldingly biased toward the open end of said body; a slot in said release arm at the junction of said vertically and horizontally disposed sections which is adapted for the reception of the end of a cable, means by which the end of a cable is releasably retained in said slot during normal operation of said release mechanism; said actuating nut being adapted to engage said links, when said rod is moved rearwardly in said body due to an overload against the resistance of said resilient displaceable member, and rotate said latching means out of engagement with said horizontally disposed section thereby permitting said release arm to rotate out from said body through the said slot in said body and effect the discharge of the end of a cable from the said slot in said release arm.

References Cited by the Examiner

UNITED STATES PATENTS

| | | | |
|---|---|---|---|
| 1,091,449 | 3/14 | Westin | 74—584 X |
| 3,011,654 | 12/61 | Cannon et al. | 74—584 X |
| 3,077,114 | 2/63 | Murr | 74—2 |

BROUGHTON G. DURHAM, *Primary Examiner.*

MILTON KAUFMAN, *Examiner.*